United States Patent
Roldan-Posada

(10) Patent No.: US 8,667,801 B2
(45) Date of Patent: Mar. 11, 2014

(54) COMBUSTOR LINER ASSEMBLY WITH ENHANCED COOLING SYSTEM

(75) Inventor: Carlos Roldan-Posada, Miami, FL (US)

(73) Assignee: Siemens Energy, Inc., Orlando, FL (US)

( * ) Notice: Subject to any disclaimer, the term of this patent is extended or adjusted under 35 U.S.C. 154(b) by 807 days.

(21) Appl. No.: 12/877,150

(22) Filed: Sep. 8, 2010

(65) Prior Publication Data

US 2012/0055165 A1 Mar. 8, 2012

(51) Int. Cl.
*F02C 1/00* (2006.01)

(52) U.S. Cl.
USPC .......................................... 60/752; 60/39.37

(58) Field of Classification Search
USPC ........................................ 60/752–760, 39.37
See application file for complete search history.

(56) References Cited

U.S. PATENT DOCUMENTS

| | | | |
|---|---|---|---|
| 3,307,354 A * | 3/1967 | Macaulay et al. | 60/757 |
| 3,702,058 A | 11/1972 | De Corso et al. | |
| 3,793,827 A | 2/1974 | Ekstedt | |
| 4,934,145 A | 6/1990 | Zeisser | |
| 5,737,922 A * | 4/1998 | Schoenman et al. | 60/752 |
| 6,018,950 A | 2/2000 | Moeller | |
| 6,098,397 A | 8/2000 | Glezer et al. | |
| 6,672,070 B2 * | 1/2004 | Bland et al. | 60/772 |
| 6,681,578 B1 | 1/2004 | Bunker | |
| 6,966,173 B2 | 11/2005 | Dewis | |
| 7,540,156 B2 | 6/2009 | Brown et al. | |
| 8,166,764 B2 * | 5/2012 | Chokshi et al. | 60/772 |
| 8,402,764 B1 * | 3/2013 | Liang | 60/755 |
| 2004/0074236 A1 * | 4/2004 | Mandai et al. | 60/752 |
| 2005/0044857 A1 * | 3/2005 | Glezer et al. | 60/772 |
| 2008/0115499 A1 | 5/2008 | Patel et al. | |
| 2009/0120093 A1 * | 5/2009 | Johnson et al. | 60/752 |

\* cited by examiner

*Primary Examiner* — Phutthiwat Wongwian

(57) ABSTRACT

An enhanced cooling system for the downstream end of a combustor liner assembly is provided. The downstream end region of the combustor liner assembly is formed by a subassembly comprising an outer tubular member, an inner tubular member and a middle band. The middle band includes a plurality of undulations having alternating peaks and valleys. The middle band is operatively positioned between the inner and outer tubular members to form a plurality of elongated cooling passages. A turbulence generator is provided along each of the cooling passages and extends radially inward from a portion of the peaks such that the turbulence generator and the valleys contact an outer peripheral surface of the inner tubular member. The surface area of the middle band that is in contact with the inner tubular member is greater than the surface area of the middle band that is in contact with the outer tubular member.

18 Claims, 9 Drawing Sheets

COMBUSTOR LINER ASSEMBLY WITH ENHANCED COOLING SYSTEM

FIELD OF THE INVENTION

The invention generally relates to turbine engines, and more particularly to combustor liners in a turbine engine.

BACKGROUND OF THE INVENTION

A turbine engine has a compressor section, a combustor section and a turbine section. In operation, the compressor section can induct ambient air and compress it. The compressed air can enter the combustor section and can be distributed to each of the combustors therein. FIG. 1 shows one example of a known combustor 10. When the compressor discharge air 12 enters the combustor 10, it is mixed with fuel supplied by a pilot nozzle 16 and a plurality of main nozzles 14 surrounding the pilot nozzle 16. Combustion of the air-fuel mixture 17 occurs downstream of the nozzles 14, 16 in a combustion zone 18, which is largely enclosed within a combustor liner assembly 20. As a result, a hot working gas is formed. The hot working gas can be routed to the turbine section, where the gas can expand and generate power that can drive a rotor. The combustor liner assembly 20 must be cooled to withstand the high temperature of the combustion occurring within. One particular area of the combustor liner assembly 20 that is subjected to some of the highest combustion temperatures is the downstream end region 22, which includes the downstream end 24.

One known manner of cooling the downstream end region 22 of the combustor liner assembly 20 is shown in FIG. 2. The downstream end region 22 of the combustor liner assembly 20 is typically formed separately from the rest of the combustor liner assembly 20. The downstream end region 22 of the combustor liner assembly 20 includes an outer cylinder 26 and an inner cylinder 28. The inner cylinder 28 is received in the outer cylinder 26, and the cylinders 26, 28 are joined together. The joined inner and outer cylinders 28, 26 are then joined to an upstream portion 30 of the combustor liner assembly 20. A spring clip 32 can operatively engage the outer cylinder 26 and an inner surface 34 of a transition duct 36, which routes the working gas to the turbine section.

Referring to FIG. 3, the inner cylinder 28 includes a plurality of fins 38 machined therein. An elongated, straight cooling channel 40 is defined between neighboring fins 38. The outer cylinder 26 includes a plurality of holes 42 near an upstream end thereof, as is shown in FIG. 2. The holes 42 can be distributed circumferentially about the outer cylinder 26. Each of the holes 42 is in fluid communication with a respective one of the cooling channels 40.

During engine operation, a portion of the compressor discharge air 12 is used to cool the downstream end region 22 of the combustor liner assembly 20. The compressor discharge air 12 enters the holes 42 in the outer cylinder 26, which meter the amount of air 12 that flows into the cooling channels 40. The air 12 passes along the cooling channels 40 between the fins 38, removing some of the heat by convection. The air 12 is ultimately exhausted out of the downstream end 24 of the combustor liner assembly 20. The air 12 joins the working gas flow in the transition duct 36, but it does not actively participate in the air/fuel mixture for the combustion process.

Such an arrangement has a number of drawbacks. For instance, the use of this air to cool the downstream end region 22 of the combustor liner assembly 20 takes away from its beneficial use elsewhere in the engine, such as to being available to burn in a fuel-lean mixture so as to help reduce NOx formation. Moreover, the straight cooling channels 40 are not optimized for convective heat transfer. Further, the inner cylinder 28 is expensive to fabricate. Additionally, there can be a gap between the inner cylinder 28 and the outer cylinder 26. Such a gap may arise due to manufacturing tolerances, misalignment during assembly and differential thermal expansion of the cylinders 26, 28 during engine operation. The size of the gap can vary during engine operation. Further, the size of the gap is often not uniform in the circumferential direction, which impacts the quality and efficiency of heat transfer and part life.

Thus, there is a need for a liner system that can minimize such concerns.

SUMMARY OF THE INVENTION

Embodiments of the invention are directed to a turbine engine component. The component has a generally tubular component body. The component body has an upstream end, a downstream end, and a downstream end region. The component body has an associated longitudinal axis. The component body has an inner peripheral surface and an outer peripheral surface. In one embodiment, the component body can be a combustor liner.

A plurality of cooling passages extends through the component body in a direction that is substantially parallel to the longitudinal axis. In one embodiment, the cooling passages may be provided in only the downstream end region of the component body. At least one of the cooling passages can be in fluid communication with at least one neighboring cooling passage. Alternatively, the cooling passages may not be in fluid communication with each other.

A turbulence generator is provided along one or more of the cooling passages. The turbulence generator can cause disruptions in the flow of fluid along the cooling passage.

In one embodiment, at least a portion of the component body can be formed by an outer tubular member, an inner tubular member and a middle band. The outer tubular member can have an outer peripheral surface and an inner peripheral surface. The inner tubular member has an outer peripheral surface and an inner peripheral surface. The middle band includes a plurality of undulations that define alternating peaks and valleys. The undulations of the middle band can have any suitable configuration. For instance, the undulations can be configured as a sinusoidal wave, a triangular wave, a square wave, a rectangular wave or a trapezoidal wave.

The middle band can be operatively positioned between the inner and outer tubular members such that the plurality of cooling passages is formed between these components. A plurality of holes can extend through the outer tubular member from the outer peripheral surface to the inner peripheral surface. Each of the holes can be in fluid communication with a respective one of the cooling passages.

The turbulence generator can extend generally radially inward from a portion of one of the peaks of at least one of the undulations. The turbulence generator can have a bottom portion. The bottom of the turbulence generator and the valleys can contact the outer peripheral surface of the inner tubular member. The bottom of the turbulence generator can be attached to the outer peripheral surface of the inner tubular member. The turbulence generator can have any suitable configuration. For instance, the turbulence generator can be configured as an undercut formed in the middle band. Alternatively, the turbulence generator can be configured as a dimple formed in the middle band.

The peaks can contact the inner peripheral surface of the outer tubular member. The surface area of the middle band that is in contact with the inner tubular member can be greater than the surface area of the middle band that is in contact with the outer tubular member.

In another respect, embodiments of the invention are directed to a combustor liner assembly. At least a portion of the combustor liner assembly includes an outer tubular member, an inner tubular member and a middle band. The outer tubular member has an outer peripheral surface and an inner peripheral surface. The inner tubular member has an outer peripheral surface and an inner peripheral surface.

The middle band includes a plurality of undulations that define alternating peaks and valleys. The undulations of the middle band can have any suitable configuration. For instance, the undulations can be configured as one of a sinusoidal wave, a triangular wave, a square wave, a rectangular wave, or a trapezoidal wave.

The middle band is operatively positioned between the inner and outer tubular members such that a plurality of cooling passages is formed between at least the middle band and the inner tubular member. In some instances, one or more cooling passages can be formed between the middle band and the outer tubular member. A plurality of holes can extend through the outer tubular member from the outer peripheral surface to the inner peripheral surface. Each of the holes can be in fluid communication with a respective one of the cooling passages.

In one embodiment, the cooling passages can be provided solely in a downstream end region of the combustor liner assembly. One or more of the cooling passages can be in fluid communication with at least one neighboring cooling passage. Alternatively, the cooling passages may not be in fluid communication with each other.

A turbulence generator is provided along at least one of the cooling passages. The turbulence generator is formed by the middle band. The turbulence generator causes disruptions in the flow of fluid along the cooling passage. The turbulence generator can be configured as an undercut formed in the middle band. The turbulence generator can also be configured as a dimple formed in the middle band.

The turbulence generator extends generally radially inward from a portion of one of the peaks of at least one of the undulations. The turbulence generator can include a bottom portion. The bottom of the turbulence generator and the valleys can contact the outer peripheral surface of the inner tubular member. The bottom of the turbulence generator can be attached to the outer peripheral surface of the inner tubular member, such as by brazing. The valleys can also be attached to the outer peripheral surface of the inner tubular member. The peaks can contact the inner peripheral surface of the outer tubular member. In some instances, the turbulence generator can be attached to either or both the outer peripheral surface of the inner tubular member and the inner peripheral surface of the outer tubular member. The surface area of the middle band that is in contact with the inner tubular member is greater than the surface area of the middle band that is in contact with the outer tubular member.

DETAILED DESCRIPTION OF EMBODIMENTS OF THE INVENTION

Embodiments of the invention are directed to a combustor liner for a turbine engine. Aspects of the invention will be explained in connection with various possible configurations for a system for cooling the downstream end region of a combustor liner, but the detailed description is intended only as exemplary. Indeed, it will be appreciated that aspects of the invention can be applied to other regions of the combustor liner as well as to other turbine engine components that require cooling. Embodiments of the invention are shown in FIGS. 4-10, but the present invention is not limited to the illustrated structure or application.

Figure 1:
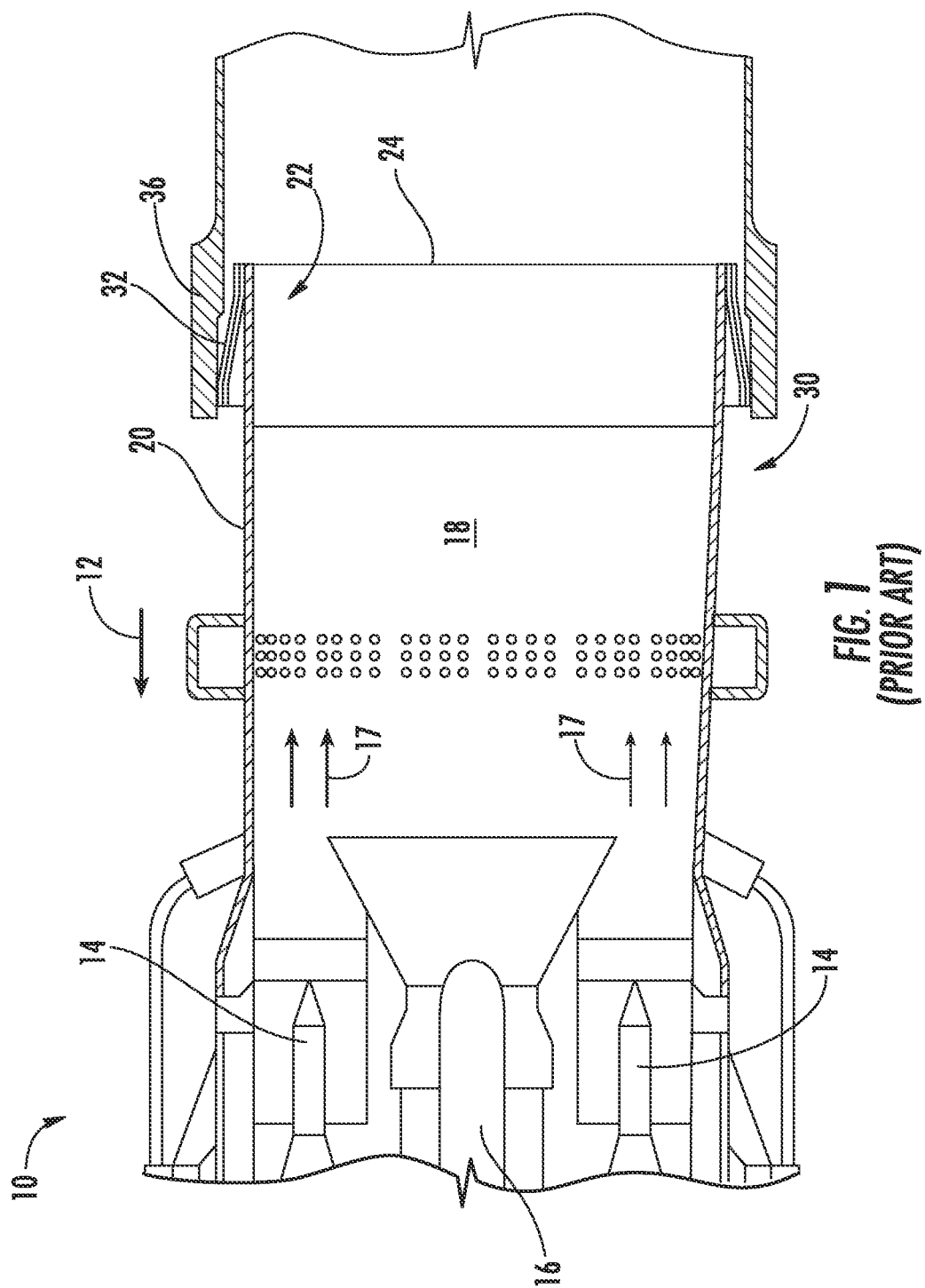
FIG. 1 is a side elevation cross-sectional view of a portion of a known combustor section of a turbine engine.
Figure 2:
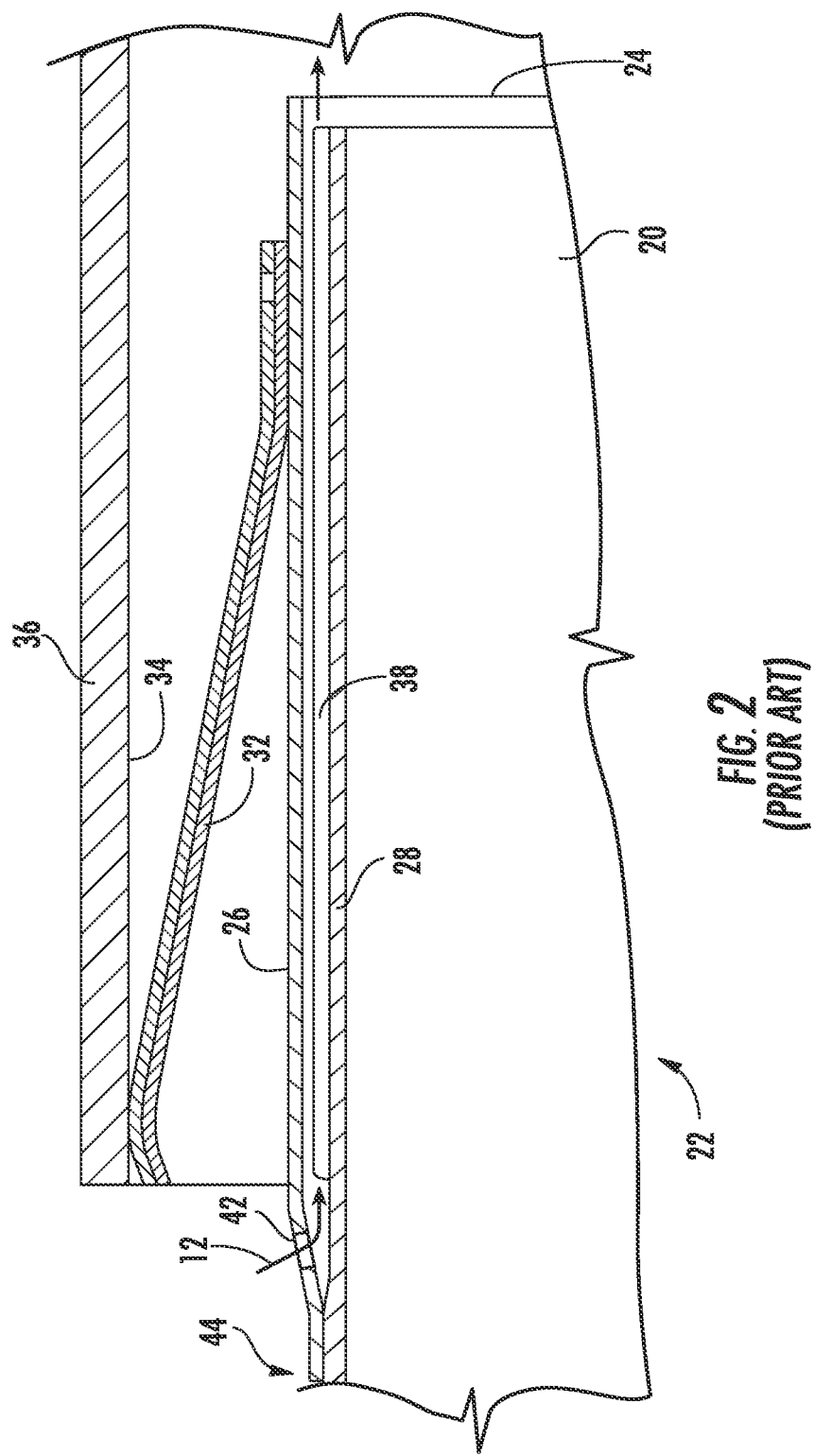
FIG. 2 is a side elevation cross-sectional view of a downstream end region of a known combustor liner.
Figure 3:
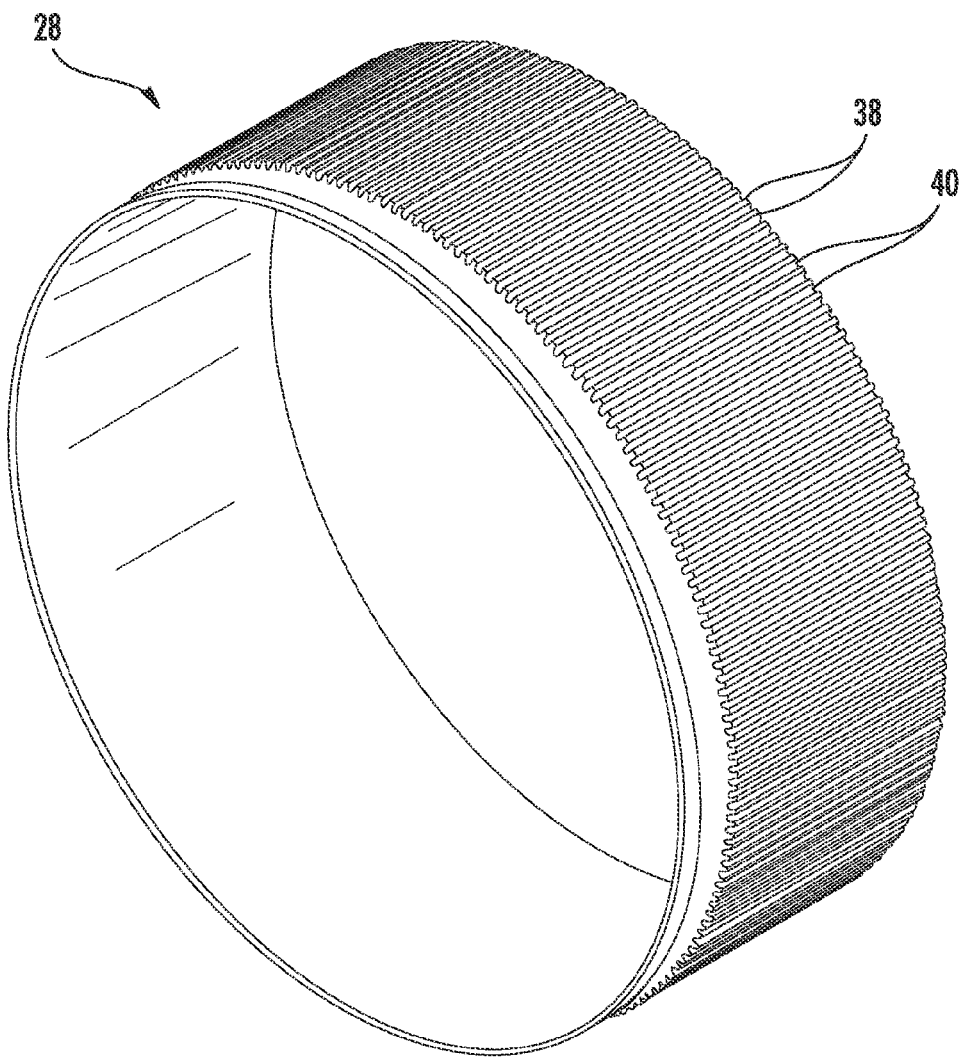
FIG. 3 is a perspective view of an inner cylinder of the downstream end region of the combustor liner of FIG. 2.
Figure 4:
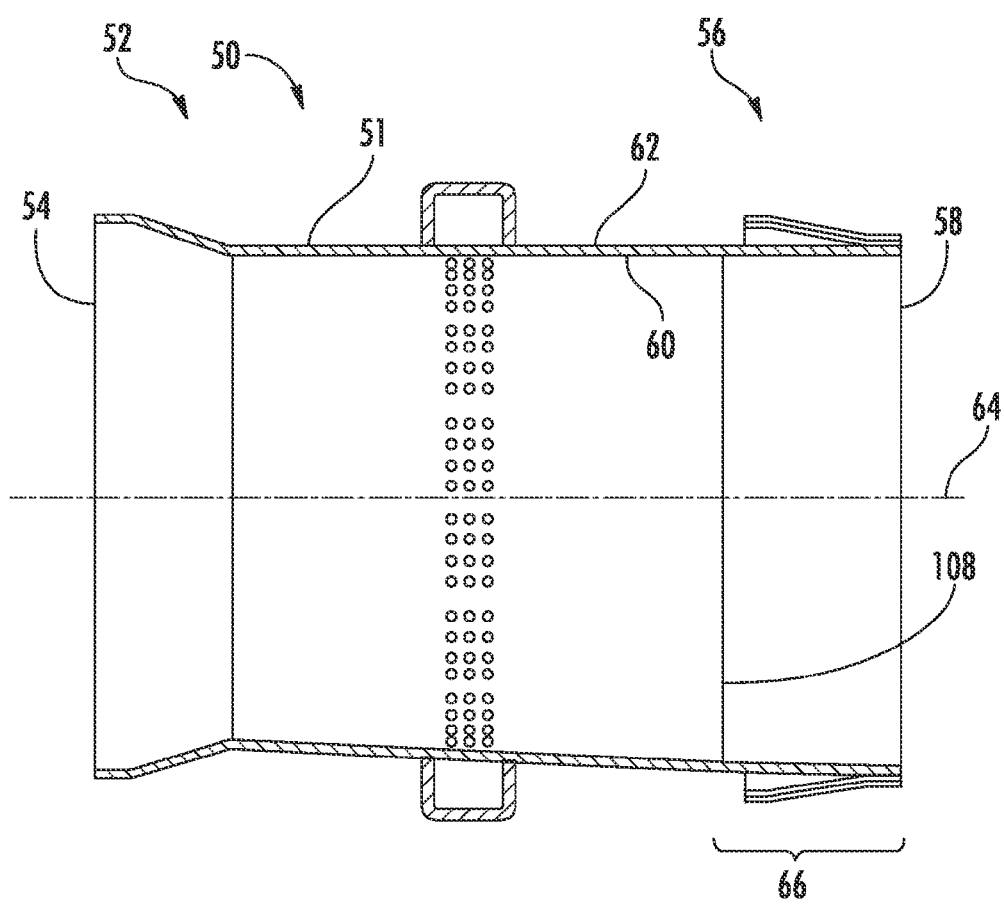
FIG. 4 is a side elevation cross-sectional view of a combustor liner assembly according to aspects of the invention.

Referring to FIG. 4, a combustor liner assembly 50 configured according to aspects of the invention is shown. The combustor liner assembly 50 has a body 51 and can include an upstream end region 52 including an upstream end 54 and a downstream end region 56 including a downstream end 58. The terms "upstream" and "downstream" are intended to mean relative to the direction of fluid flow within the combustor liner assembly 50 during engine operation. The combustor liner assembly 50 can have an inner peripheral surface 60 and an outer peripheral surface 62. The combustor liner assembly 50 can have an associated longitudinal axis 64. The terms "inner" and "outer" are intended to mean relative to the longitudinal axis 64 of the combustor liner assembly 50.

The combustor liner assembly 50 can be substantially tubular. The combustor liner assembly 50 can have any suitable cross-sectional conformation, including, for example, being substantially circular, oval, rectangular or polygonal. The cross-sectional size and/or shape of the combustor liner assembly 50 can be substantially constant along its length or it can vary along at least a portion of its length.

As will be explained in greater below in connection with specific embodiments, a plurality of cooling passages can extend within the thickness of the combustor liner assembly 50 in at least the downstream end region 56 thereof. The cooling passages can extend generally in the longitudinal direction, that is, generally parallel to the longitudinal axis 64. The cooling passages can be substantially identical to each other or at least one of the cooling passages can be different from the rest of the cooling passages. The cooling passages can be distributed circumferentially in any suitable manner about at least the downstream end region 56 of the combustor liner assembly 50. The cooling passages can have any suitable cross-sectional size and/or shape. The cross-sectional area of the cooling passages can be substantially constant, or it can vary along at least a portion of the length of the cooling passages. The cooling passages can extend through the downstream end 58 of the combustor liner 50. According to aspects of the invention, one or more turbulence generators can be provided along one or more of the cooling passages. The turbulence generators can be configured to cause disruptions in the flow of coolant along the cooling passages to thereby promote convective heat transfer.

A combustor liner assembly 50 with cooling passages and turbulence generators according to aspects of the invention can be achieved in various ways. Some examples will now be described in connection with FIGS. 5-10, but it will be understood that embodiments are not limited to the particular arrangements shown and described herein.

Figure 5:
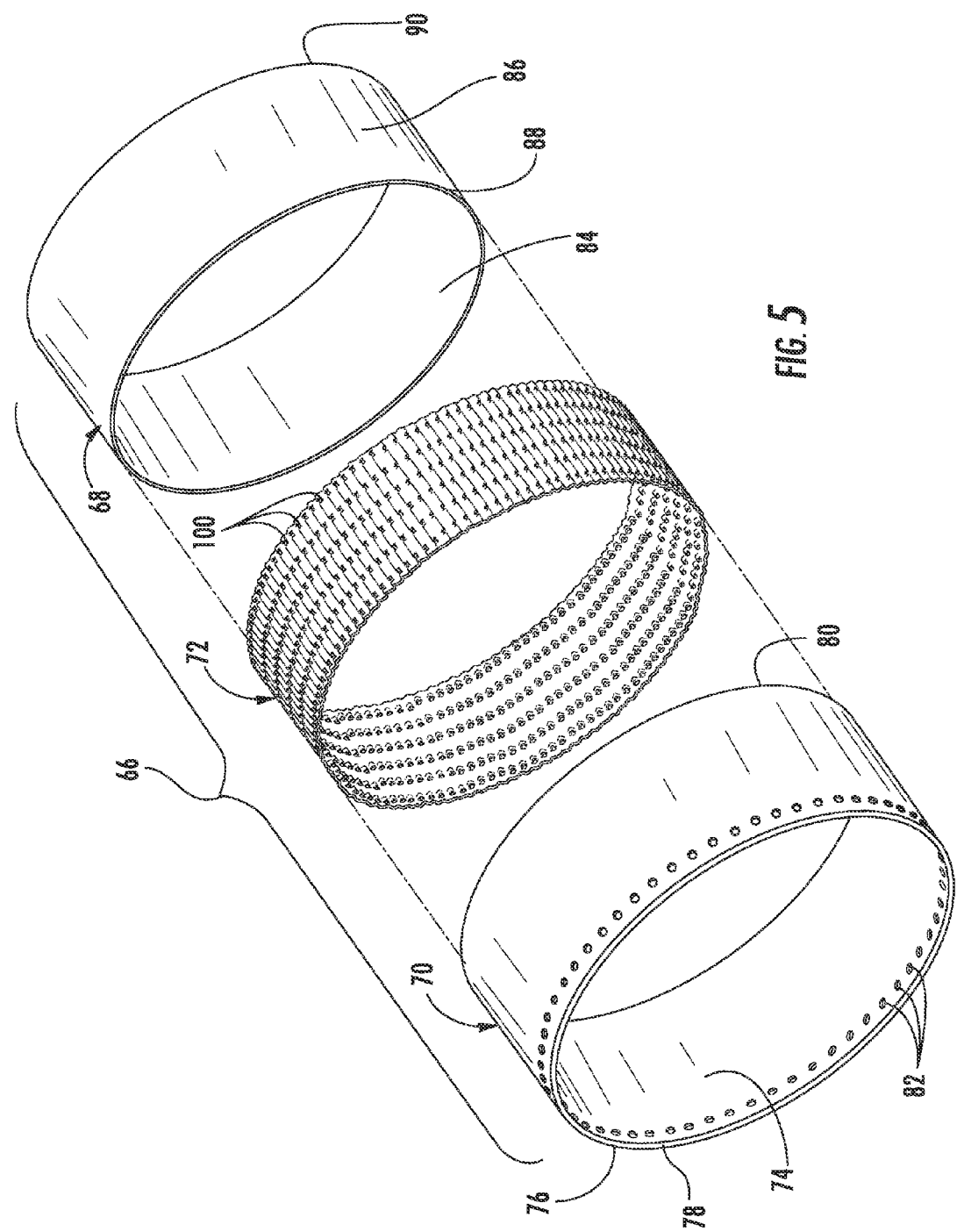
FIG. 5 is an exploded view of a downstream end subassembly of a combustor liner according to aspects of the invention.

The downstream end region 56 of the combustor liner assembly 50 can include a downstream end subassembly 66 that can be formed separately from the rest of the combustor liner assembly 50. In one embodiment, the downstream end subassembly 66 can include an inner tubular member 68, and outer tubular member 70 and a middle band 72 sandwiched between the inner and outer tubular members 68, 70, as is shown in FIG. 5.

The inner tubular member 68 can define the inner peripheral surface 60 of the combustor liner assembly 50 in the downstream end region 56 thereof. The outer tubular member 70 can define the outer peripheral surface 62 of the combustor liner assembly 50 in the downstream end region 56 thereof. The inner and outer tubular members 68, 70 can have any suitable cross-sectional conformation, including, for example, substantially circular, oval, rectangular or polygonal. The cross-sectional size and/or shape of the inner and outer tubular members 68, 70 can be substantially constant along their lengths or it can vary along at least a portion of their lengths. The inner and outer tubular members 68, 70 can be made of any suitable material. The inner and outer tubular members 68, 70 can be made of the same material, or they can be made of different materials.

The outer tubular member 70 can have an inner peripheral surface 74 and an outer peripheral surface 76. The outer tubular member 70 can have an upstream end 78 and a downstream end 80. A plurality of holes 82 can extend through the outer tubular member 70 from the outer peripheral surface 76 to the inner peripheral surface 74. The holes 82 can be proximate to the upstream end 78 of the outer tubular member 70. The inner tubular member 68 can have an inner peripheral surface 84 and an outer peripheral surface 86. Again, the terms "inner" and "outer" are intended to mean relative to the longitudinal axis 64 of the combustor liner assembly 50. The inner tubular member 68 can have an upstream end 88 and a downstream end 90.

Figure 8:
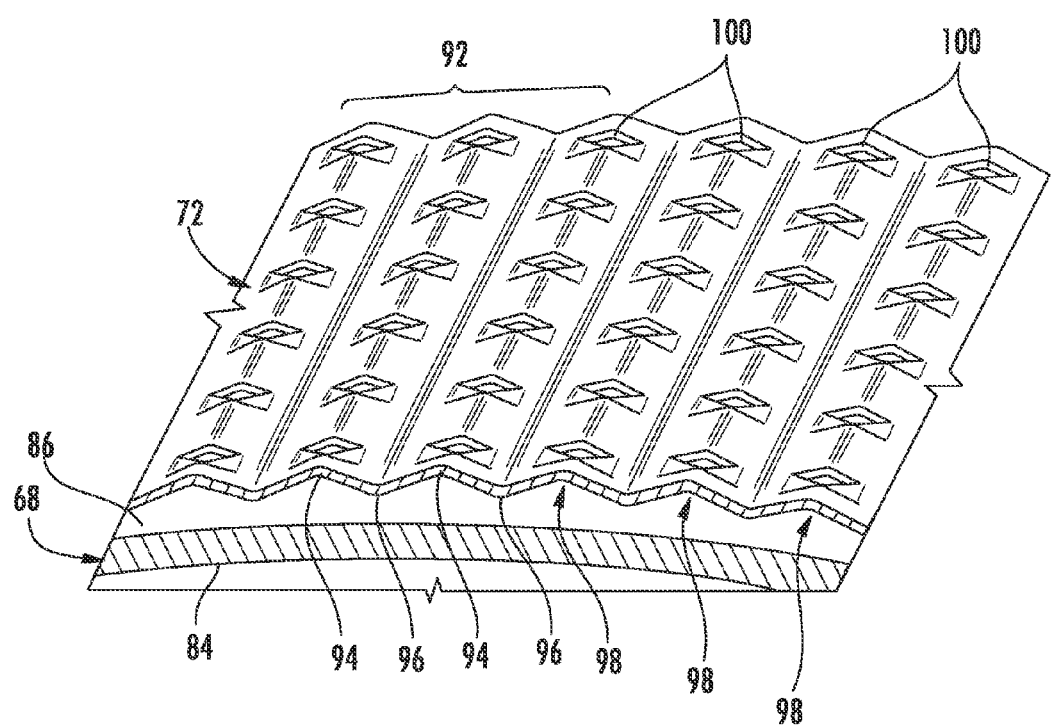
FIG. 8 is a perspective view of a portion of a middle band engaging an inner tubular member of a downstream end subassembly according to aspects of the invention, wherein the undulations of the middle band are substantially triangular.
Figure 9:
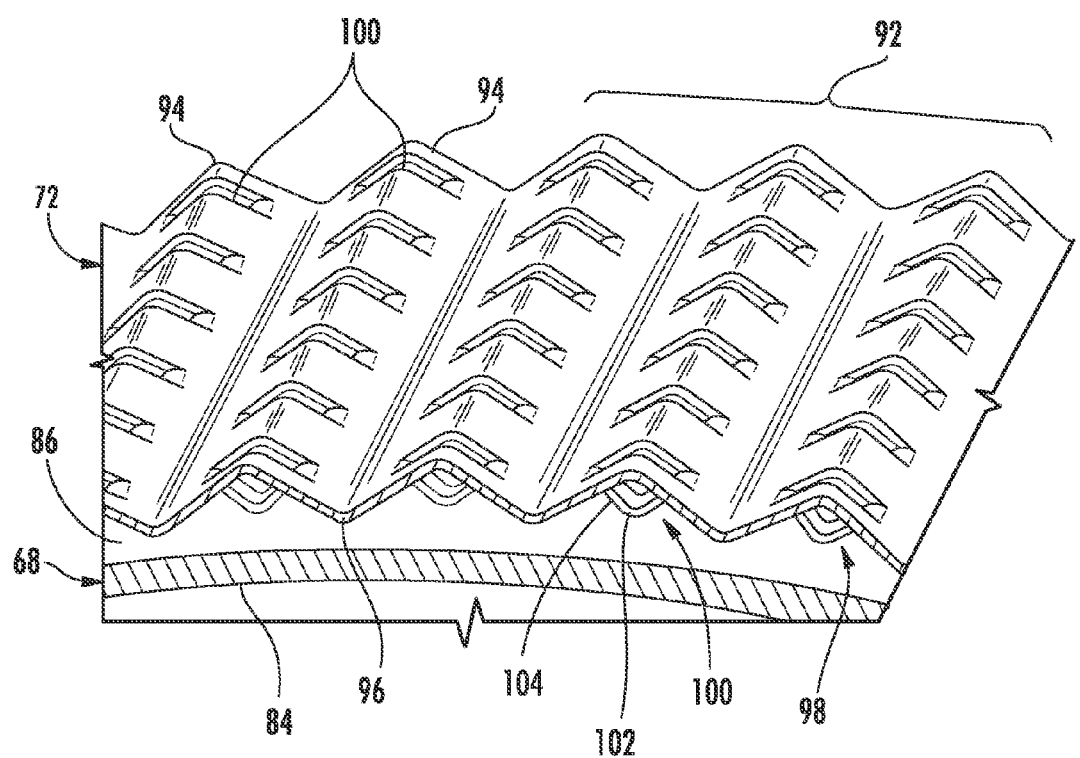
FIG. 9 is a perspective view of a portion of a middle band engaging an inner tubular member of a downstream end subassembly according to aspects of the invention, wherein an alternative arrangement of substantially triangular undulations of the middle band is shown.
Figure 10:
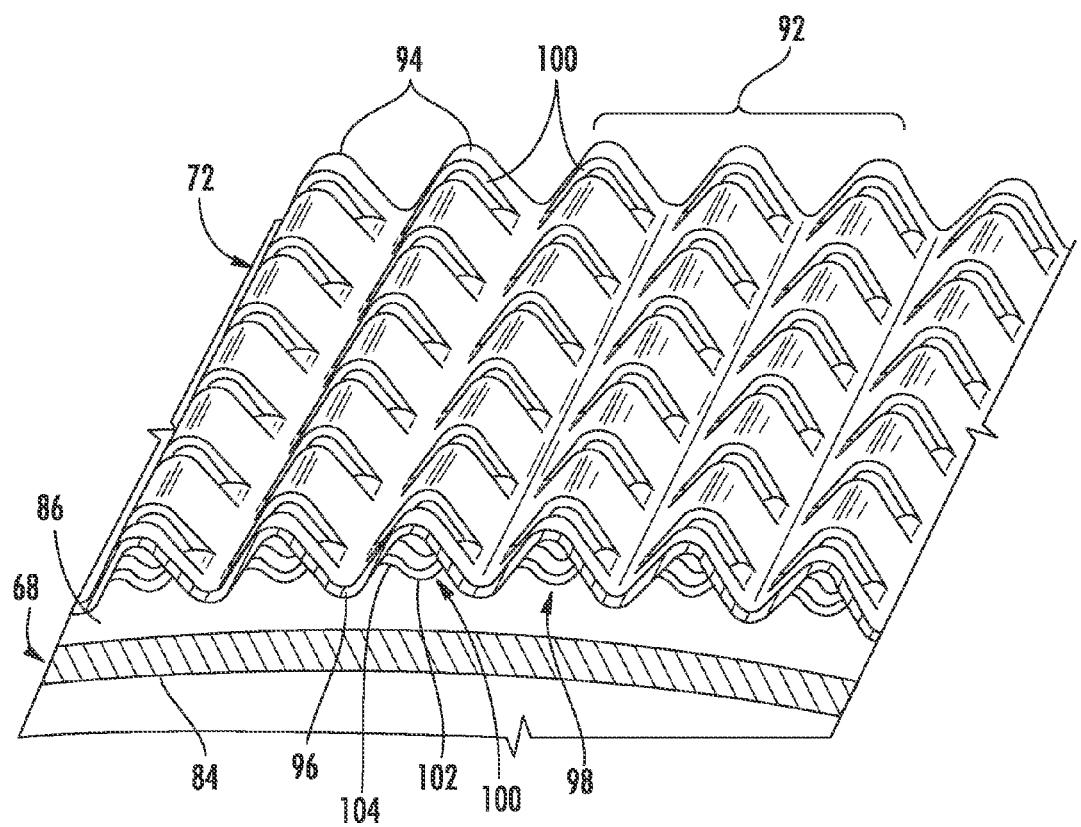
FIG. 10 is a perspective view of a portion of a middle band engaging an inner tubular member of the downstream end subassembly according to aspects of the invention, wherein the undulations of the middle band are substantially sinusoidal.

The middle band 72 can be generally tubular and can have a series of undulations 92 distributed circumferentially about the middle band 72. The undulations 92 can have any suitable size and/or shape. In one embodiment, the undulations 92 can be generally wave-like. Various wave-like configurations are possible, including, for example, substantially sinusoidal waves (FIG. 10), substantially triangular waves (FIGS. 8-9), substantially rectangular waves (not shown), substantially sawtooth (not shown) and substantially trapezoidal waves (not shown). Of course, the middle band 72 can include combinations of these wave-types. FIGS. 8 and 9 show two examples of a substantially triangular wave form to demonstrate that variations in the configuration of the middle band 72 are possible to achieve a desired or required heat removal performance.

The wave shape can be a regular or irregular waveform. The wave shape can be periodic over at least a portion of its length. Embodiments according to aspects of the invention are not limited to any particular type of wave. In one embodiment, the waves or undulations 92 can be substantially identical about the middle band 72. In one embodiment, one or more of the individual waves or undulations 92 can be different from the other waves or undulations 92 in terms of size, shape, width, pitch, height and/or length, just to name a few possibilities.

Figure 6:
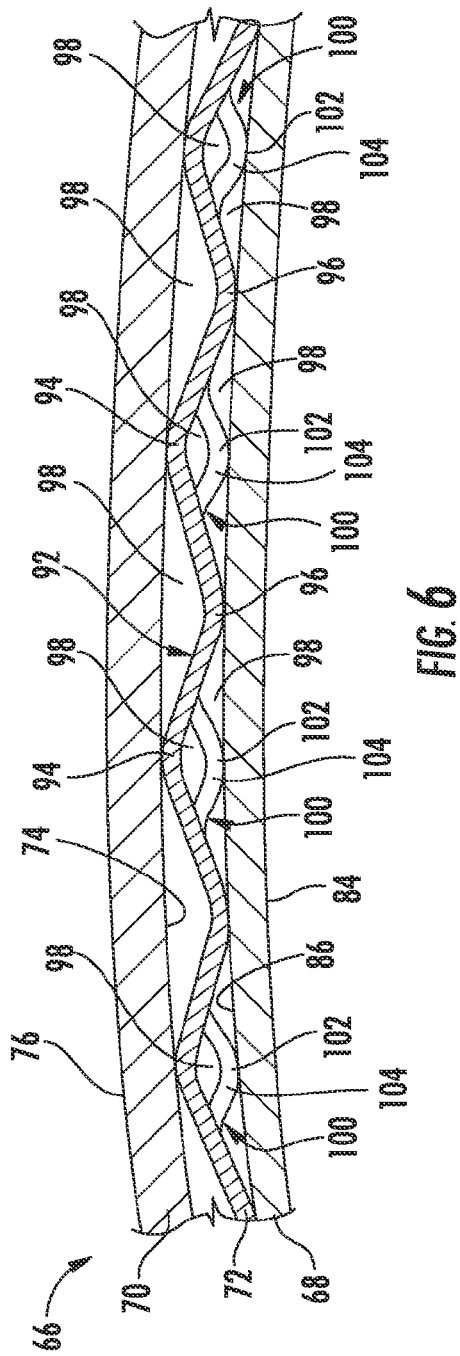
FIG. 6 is a side elevation cross-sectional view of the downstream end subassembly of a combustor liner configured according to aspects of the invention, showing a plurality of turbulence generators formed by undercuts in the middle band.
Figure 7:
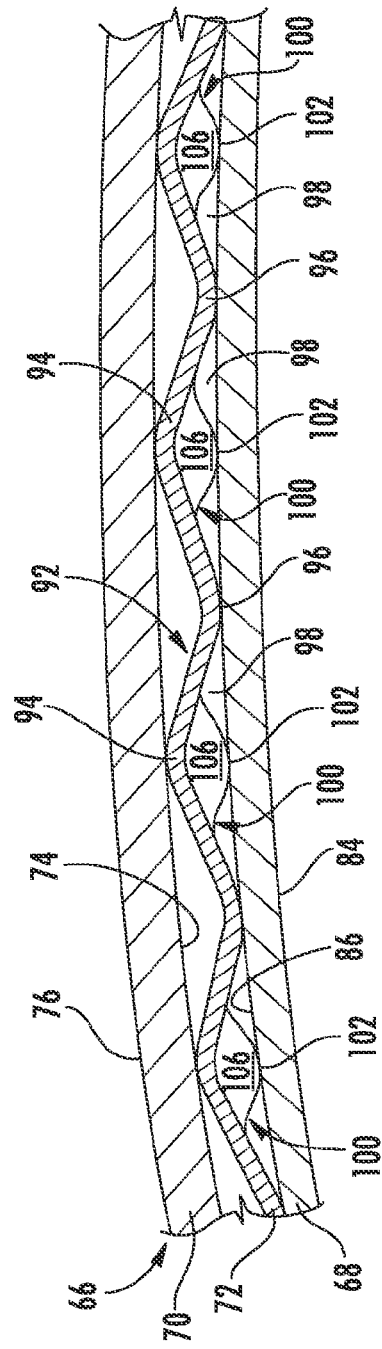
FIG. 7 is a side elevation cross-sectional view of the downstream end subassembly of a combustor liner configured according to aspects of the invention, showing a plurality of turbulence generators formed by dimples in the middle band.

Referring to FIGS. 6-7, the undulations 92 can define a series of peaks 94 and valleys 96. The peaks 94 can alternate with the valleys 96 in the circumferential direction. The peaks 94 can generally extend in the radially outward direction relative to the longitudinal axis 64. The valleys 96 can generally extend in the radially inward direction relative to the longitudinal axis 64. When sandwiched between the inner and outer tubular members 68, 70, the valleys 96 can engage the outer peripheral surface 86 of the inner tubular member 68. The peaks 94 may engage the inner peripheral surface 74 of the outer tubular member 70. The inner tubular member 68 and the middle band 72 can define a plurality of cooling passages 98. In some instances, additional cooling passages 98 may be defined between the outer tubular member 70 and the middle band 72.

According to embodiments of the invention, one or more turbulence generators 100 can be provided along one or more of the cooling passages 98. Each turbulence generator 100 can have a bottom 102. The turbulence generators 100 can be provided in any suitable manner. For instance, the turbulence generators 100 can be formed by the middle band 72 itself. In one embodiment, the turbulence generators 100 can be formed at one or more points along the peaks 94 of the middle band 72. As an example, one or more turbulence generators 100 can be formed as an undercut 104 in the peaks 94 of the middle band 72, as is shown in FIG. 6. In such case, the material of the middle band 72 can be cut but is pressed radially inward to form the undercut 104. Each cooling passage 98 having such an undercut 104 can be in fluid communication with neighboring cooling passages 98.

Alternatively, the turbulence generators 100 can be formed as a dimple 106 in the peaks 94 of the middle band 72, as is shown in FIG. 7. In such case, a portion of the middle band 72 is pressed radially inward without cutting or breaking the material. Also, each of the cooling passages 98 can be isolated from the other cooling passages 98. Aside from being formed by the middle band 72 itself, the turbulence generators 100 may also be formed by one or more separate pieces attached to the middle band 72. Regardless of the configuration, the bottom 102 of each turbulence generator 100 and the plurality of valleys 96 can be substantially circumferentially aligned.

There can be any suitable quantity of turbulence generators 100 provided along each cooling passage 98. That is, there can be any suitable quantity of turbulence generators 100 associated with each peak 94. There can be at least one turbulence generator 100 associated with each peak 94. In instances in which there is a plurality of turbulence generators 100 associated with a peak 94, the turbulence generators 100 can be distributed in any suitable manner. For instance, the spacing between turbulence generators 100 can be at regular or irregular intervals in the longitudinal direction, that is, in the direction of the longitudinal axis 64.

The quantity and arrangement of turbulence generators 100 can be identical for all cooling passages 98. Alternatively, at least one of the cooling passages 98 can have a different quantity and/or arrangement of turbulence generators 100. For instance, the turbulence generators 100 in one cooling passage 98 can be offset from the turbulence generators 100 in neighboring cooling passages 98.

The middle band 72 can be made of any suitable material, including for example, Hastalloy-X or stainless steel. Significantly, the middle band 72 can be made of sheet metal. In one embodiment, the sheet metal can be from about 0.002 inches to about 0.02 inches thick. The undulations 92 and the turbulence generators 100 can be formed in the sheet metal in any suitable manner, such as through a sequence of steps in a die-roll process. The undulations 92 and the turbulence generators 100 can be defined and optimized according to heat transfer needs.

The middle band 72 can be received between the inner and outer tubular members 68, 70. The plurality of valleys 96 and the bottom 102 of each turbulence generator 100 can be attached to the outer peripheral surface 86 of the inner tubular member 68. Such attachment can be achieved in any suitable manner, such as by brazing, bonding, adhesives or mechanical engagement, just to name a few possibilities. In some instances, the peaks 94 of the turbulence generators 100 can be attached to the inner peripheral surface 74 of the outer tubular member 70 in any suitable manner.

In one embodiment, the middle band 72, in the form of a sheet but after the desired features have been included therein, can be wrapped around the outer peripheral surface 86 of the inner tubular member 68 with a braze foil between them. The circumferential ends of the middle band 72 can be joined in any suitable manner. Next, the outer tubular member 70 can be slid over the middle band 72 and the inner tubular member 68. In some instances, a braze foil can be placed between the middle band 72 and the inner peripheral surface 74 of the outer tubular member 70.

The assembly can be held together in any suitable manner, such as by a jig or fixture. The assembly can undergo a brazing process for diffusion bonding of the braze foil. During this process, all surfaces contacting the braze foil are bonded together. A braze bond can be formed only between the outer peripheral surface 86 of the inner tubular member 68 and the plurality of valleys 96 and the bottom 102 of each turbulence generator 100 of the middle band 72. In such case, there can be a detached interface between the peaks 94 of the undulations 92 and the inner peripheral surface 74 of the outer tubular member 70. In such case, differential thermal expansion and contraction of the middle band 72 and the outer tubular member 70 can be accommodated.

In other embodiments, a braze bond may also be formed between the inner peripheral surface 74 of the outer tubular member 70 and the peaks 94 of the middle band 72. Once the bonding is completed, the downstream end subassembly 66 is formed with the middle band 72 disposed between the inner and outer tubular members 68, 70. The middle band 72 may not be a structural load bearing member. It should be noted that each of the holes 82 in the outer tubular member 70 can be in fluid communication with a respective one of the cooling passages 98. After brazing, the downstream end subassembly 66 can be welded to the aft end 108 (FIG. 4) of an upstream portion of the rest of the combustor liner assembly 50, as is the current practice.

It will be appreciated that, a greater surface area of the middle band 72 engages or contacts the inner tubular member 68 than the outer tubular member 70 because, in addition to the valleys 96, the bottom 102 of each turbulence generator 100 contacts the inner tubular member 68. Such a condition is significant because, during engine operation, the inner tubular member 68 is directly exposed to the high temperature combustion gases within the combustor liner assembly 50, and the greater contact between the middle band 72 and the inner tubular member 68 can facilitate conduction heat transfer.

Now that the individual components have been described along with their manner of assembly, the use of a combustor liner assembly according to aspects of the invention will now be described. The following description is provided as an example and is not intended to be limited.

During engine operation, hot combustion gases flow through the combustor liner assembly 50. A portion of the compressor discharge air can be used to cool the downstream end region 56 of the combustor liner assembly 50. Compressor discharge air can enter the holes 82 in the outer tubular member 70 and can flow into the cooling passages 98. As the air flows along the cooling channels 98, heat from the inner tubular member 68 can be transferred to the air by convective/film heat transfer. Eventually, the air will encounter a turbulence generator 100, which causes disturbances in the air flow, thereby increasing the heat transfer coefficient. Further, because the valleys 96 and the turbulence generators 100 are attached to the outer peripheral surface 86 of the inner tubular member 68, heat transfer by conduction from the inner tubular member 68 to the middle band 72 is promoted. Differential thermal expansion between the inner and outer tubular members 68, 70 can be accommodated by the middle band 72, which can act like a spring.

A combustor liner assembly configured according to aspects of the invention can provide significant benefits. For instance, heat transfer of the downstream end region can be enhanced, providing more efficient cooling to the downstream end region of the combustor liner assembly. Heat transfer efficiency can be improved; consequently, less cooling air is needed. This air can be used for other beneficial purposes in the engine, such as being used to create a leaner fuel/air mixture (increasing the air component while keeping the fuel component constant), which, in turn, can reduce NOx emissions.

Further, manufacturing costs can be reduced compared to existing designs. Indeed, significant cost reductions can be attained because the undulations and turbulence generators can be formed in sheet metal with conventional processes, such as die rolls, in a repeatable and continuous way. Optimum heat transfer features such as wave pitch, wave height, dimples, holes, slots, tabs and undercuts can be generated easily in the rolling/forming process.

The foregoing description is provided in the context of one possible configuration for the system according to aspects of the invention. While the above description is made in the context of a downstream end region of a combustor liner assembly, it will be understood that the system according to aspects of the invention may be applied to other portions of the combustor liner as well as other turbine engine components, such as the transition duct. Thus, it will of course be understood that the invention is not limited to the specific details described herein, which are given by way of example only, and that various modifications and alterations are possible within the scope of the invention as defined in the following claims.

What is claimed is:

1. A turbine engine component comprising:
a generally tubular component body having an upstream end adapted to couple to an upstream turbine combustor component and to receive a combustor fluid flow, a downstream end, and a downstream end region, the component body having an associated longitudinal axis aligned with a longitudinal axis of the upstream turbine combustor component, the component body having an inner peripheral surface and an outer peripheral surface;

a plurality of cooling passages extending through the component body in a direction substantially parallel to the longitudinal axis; and a turbulence generator provided along at least one of the cooling passages, whereby the turbulence generator causes disruptions in the flow of fluid along the cooling passage;

wherein at least one of the cooling passages is in fluid communication with at least one neighboring cooling passage.

2. The turbine engine component of claim 1, wherein the component body is a combustor liner.

3. The turbine engine component of claim 1, wherein the cooling passages are provided in only the downstream end region of the component body.

4. A turbine engine component comprising:

a generally tubular component body having an upstream end adapted to couple to an upstream turbine combustor component and to receive a combustor fluid flow, a downstream end, and a downstream end region, the component body having an associated longitudinal axis, wherein the component body includes;

an outer tubular member having an outer peripheral surface and an inner peripheral surface, an inner tubular member having an outer peripheral surface and an inner peripheral surface, and a middle band including a plurality of undulations defining alternating peaks and valleys, wherein the middle band is operatively positioned between the inner and outer tubular members such that the plurality of cooling passages are formed therebetween;

a plurality of cooling passages extending through the component body in a direction substantially parallel to the longitudinal axis; and a turbulence generator provided along at least one of the cooling passages, whereby the turbulence generator causes disruptions in the flow of fluid along the cooling passage, wherein the turbulence generator extends generally radially inward from a portion of one of the peaks of at least one of the undulations such that a bottom of the turbulence generator and the valleys contact the outer peripheral surface of the inner tubular member, wherein the peaks contact the inner peripheral surface of the outer tubular member, wherein the surface area of the middle band that is in contact with the inner tubular member is greater than the surface area of the middle band that is in contact with the outer tubular member.

5. The turbine engine component of claim 4, wherein the turbulence generator is configured as an undercut formed in the middle band.

6. The turbine engine component of claim 4, wherein the turbulence generator is configured as a dimple formed in the middle band.

7. The turbine engine component of claim 4, wherein the bottom of each turbulence generator is attached to the outer peripheral surface of the inner tubular member.

8. The turbine engine component of claim 4, wherein the outer tubular member includes a plurality of holes extending therethrough from the outer peripheral surface to the inner peripheral surface, wherein each of the holes is in fluid communication with a respective one of the cooling passages.

9. The turbine engine component of claim 4, wherein the undulations of the middle band are configured as one of a sinusoidal wave, a triangular wave, a square wave, a rectangular wave, or a trapezoidal wave.

10. A combustor liner assembly comprising:

an outer tubular member having an outer peripheral surface and an inner peripheral surface;

an inner tubular member having an outer peripheral surface and an inner peripheral surface; and a middle band including a plurality of undulations defining alternating peaks and valleys, the middle band being operatively positioned between the inner and outer tubular members such that a plurality of cooling passages are formed therebetween; and a turbulence generator provided along at least one of the cooling passages, the turbulence generator being formed by the middle band, whereby the turbulence generator causes disruptions in the flow of fluid along the cooling passage, the turbulence generator extending generally radially inward from a portion of one of the peaks of at least one of the undulations such that a bottom of the turbulence generator and the valleys contact the outer peripheral surface of the inner tubular member, wherein the peaks contact the inner peripheral surface of the outer tubular member, wherein the surface area of the middle band that is in contact with the inner tubular member is greater than the surface area of the middle band that is in contact with the outer tubular member.

11. The combustor finer assembly of claim 10, wherein the turbulence generator is configured as an undercut formed in the middle band.

12. The combustor liner assembly of claim 10, wherein the turbulence generator is configured as a dimple formed in the middle band.

13. The combustor liner assembly of claim 10, wherein the bottom of each turbulence generator is attached to the outer peripheral surface of the inner tubular member.

14. The combustor liner assembly of claim 10, wherein the outer tubular member includes a plurality of holes extending therethrough from the outer peripheral surface to the inner peripheral surface, wherein each of the holes is in fluid communication with a respective one of the cooling passages.

15. The combustor liner assembly of claim 10, wherein the undulations of the middle band are configured as one of a sinusoidal wave, a triangular wave, a square wave, a rectangular wave, or a trapezoidal wave.

16. The combustor liner assembly of claim 10, wherein the cooling passages are provided in only a downstream end region of the combustor liner assembly.

17. The combustor liner assembly of claim 10, wherein the cooling passages are not in fluid communication with each other.

18. The combustor liner assembly of claim 10, wherein at least one of the cooling passages is in fluid communication with at least one neighboring cooling passage.

* * * * *